US005476698A

United States Patent [19]

Denny

[11] Patent Number: 5,476,698

[45] Date of Patent: Dec. 19, 1995

[54] SLAPPER PICKING TICKET

[75] Inventor: Robert A. Denny, St. Louis, Mo.

[73] Assignee: Moore Business Forms, Inc., Grand Island, N.Y.

[21] Appl. No.: 320,429

[22] Filed: Oct. 6, 1994

[51] Int. Cl.[6] .................... B32B 7/06; G09F 3/02

[52] U.S. Cl. .................... 428/40; 283/81; 428/41; 428/42; 428/43; 428/131; 428/137; 428/192; 428/194

[58] Field of Search .................... 428/40, 43, 41, 428/42, 354, 131, 137, 914, 192, 194; 283/81

[56] References Cited

U.S. PATENT DOCUMENTS

| | | | |
|---|---|---|---|
| 4,306,367 | 12/1981 | Otto | 40/312 |
| 4,318,235 | 3/1982 | Augeri | 40/300 |
| 4,324,823 | 4/1982 | Ray | 428/40 |
| 4,633,276 | 12/1986 | Shibata | 428/40 |
| 4,699,833 | 10/1987 | Instance | 428/42 |
| 4,744,161 | 5/1988 | Instance | 40/2 R |
| 4,821,439 | 4/1989 | Wilck | 40/638 |
| 4,833,122 | 5/1989 | Doll | 428/40 |
| 4,910,058 | 3/1990 | Jameson | 428/42 |
| 4,974,311 | 8/1976 | Cherrin | 428/43 |
| 4,983,438 | 1/1991 | Jameson | 428/42 |
| 5,264,265 | 11/1993 | Kaufmann | 428/40 |
| 5,279,875 | 1/1994 | Juszak et al. | 428/42 |
| 5,324,559 | 6/1994 | Brombacher | 428/40 |

*Primary Examiner*—Nasser Ahmad

*Attorney, Agent, or Firm*—Nixon & Vanderhye

[57] ABSTRACT

A business form, particularly a label assembly, is provided which is ideally suited for use with packages of merchandise, providing a simple yet effective method for facilitating return of the merchandise if it does not meet the recipient's expectations. A first ply has top and bottom faces, a central area, and a peripheral area with an interface between the central and peripheral areas and with perforation lines at the interface. The second ply also has top and bottom faces with first permanent adhesive applied to the second ply bottom face. Second permanent adhesive is disposed on the peripheral area of the first ply bottom face, but not on the central area of the first ply bottom face, and connects the peripheral area of the first ply to the second ply top face. First indicia related to the return of merchandise in a package to which the first adhesive is applied is provided on the first ply bottom face central area. An order number and an item number corresponding to the packaged merchandise are printed as second indicia on the first ply top face peripheral area while third indicia—which includes return address indicia for return of merchandise—is provided on the second ply top face underlying the first ply bottom face central area. The label assembly may be lined or linerless. Return address indicia and outgoing address indicia are also provided on the first ply top face central area, and the first and second plies may be of thermal printing paper so that the indicia may be printed by thermal printers. A cut out may be formed in the first ply central area adjacent a perforation line to facilitate initial detachment of the first ply central area along the perforations.

20 Claims, 2 Drawing Sheets

SLAPPER PICKING TICKET

BACKGROUND AND SUMMARY OF THE INVENTION

Catalog operations, or like business facilities which ship substantial numbers of packages having merchandise (e.g. clothing, appliances, art objects, household goods, food items, and the like) therein typically accept mail or telephone orders and electronically transmit information to a warehouse where the orders are packaged for shipment. One or more items of merchandise are typically placed in a package (such as a cardboard, wood, or plastic box, most often a cardboard box), sealed, a shipping label is applied, and the package is shipped. However such operations typically have a significant number of return items, and in order to provide the most efficient operation and keep the good will of customers it is highly desirable to be able to accommodate easy return and replacement or crediting of the merchandise. It is also desirable to do this with a minimum amount of effort or investigation by mail order personnel while ensuring accuracy of records about what was returned, what replacements or credits to make, etc.

According to the present invention a business form is provided which accomplishes the above goals. According to the present invention a label assembly is provided which is relatively easy and inexpensive to manufacture yet is readily utilized to effect return of merchandise in a simple manner.

According to the present invention a label assembly is provided which includes a detachable portion which has the outgoing address on a top face, and a form to be completed by the recipient relating to the return of the merchandise (e.g. what the merchandise is, why it is being returned, information about the recipient, etc.). The detachable portion may—after completion—merely be reinserted into the carton in which the merchandise was shipped, the label assembly providing a return address for the merchandise which is exposed when the detachable portion is removed, and then the merchandise is merely shipped back. However a fail-safe mechanism is also provided according to the invention by providing indicia on portions of the label assembly that remain with the package such that if the package is returned without this completed return merchandise form the catalog operation (or other shipper) will still have sufficient information to determine to whom the merchandise was sent and the recipient can be contacted to supply the same information that was requested on the detachable form portion.

According to one aspect of the present invention a label assembly is provided comprising: A first ply having top and bottom faces, and having a central area and a peripheral area, with an interface therebetween. A second ply having top and bottom faces. First, permanent, adhesive disposed on the second ply bottom face. Second, permanent, adhesive disposed on the peripheral area of the first ply bottom face, but not on the central area of the first ply bottom face. Lines of weakness formed in the first ply at the interface between the central and peripheral areas facilitating complete detachment of the first ply central area from the first ply peripheral area. And, first indicia, on the first ply bottom face central area. The second adhesive on the peripheral area of the first ply bottom face connecting the first ply to the second ply top face.

The first indicia comprises indica related to the return of merchandise (e.g. a form asking for the name, item, the reason for return, etc.). The merchandise to which the first indicia relates typically includes an order number and an item number or both, and typically second indicia is provided on the first ply top face peripheral area. The second indicia comprises the merchandise order number or item number or both. Third indicia is provided on the second ply top face, underlying the first ply bottom face central area, the third indicia including return address indicia for return of merchandise corresponding to the second indicia.

The label assembly may be constructed in either sheet form, continuous form, lined form, or linerless form. When in lined form a release sheet covers the first adhesive on the second ply bottom face until removed when the first adhesive is brought into contact with a package containing merchandise to which the second indicia relates, the first adhesive adhering the second ply bottom face to the package.

The assembly also typically comprises fourth indicia comprising return address indicia on the first ply top face central area and fifth indicia comprising outgoing address indicia on the first ply top face central area. The lines of weakness may be perforation lines having a cut/tie ratio of about 0.113/cut to about 0.012/tie.

A cut out may be formed in the first ply central area adjacent a line of weakness to facilitate initiation of detachment of the central area from the peripheral area along the lines of weakness. Also the first ply may comprise a thermal transfer sheet and the second ply top face may include a thermosensitive layer for forming indicia when heat is selectively applied to it, so that the label assembly may be utilized with thermal printers.

According to another aspect of the present invention a label assembly is provided comprising: A first ply having top and bottom faces, and having a central area and a peripheral area, with an interface therebetween. A second ply having top and bottom faces. First, permanent, adhesive disposed on the second ply bottom face. Second, permanent, adhesive disposed on the peripheral area of the first ply bottom face, but not on the central area of the first ply bottom face. Lines of weakness formed in the first ply at the interface between the central and peripheral areas facilitating complete detachment of the first ply central area frown the first ply peripheral area. And, first indicia on the second ply top face underlying the first ply bottom face central area, the first indicia including return address indicia for return of merchandise. The second adhesive on the peripheral area of the first ply bottom face connecting the first ply to the second ply top face.

Details of this embodiment of the present invention are similar to those as described above with respect to the first embodiment.

According to yet another aspect of the present invention a label assembly is provided comprising: A first ply having top and bottom faces, and having a central area and a peripheral area, with an interface therebetween. A second ply having top and bottom faces. First, permanent, adhesive disposed on the second ply bottom face. Second, permanent, adhesive disposed on the peripheral area of the first ply bottom face, but not on the central area of the first ply bottom face. Lines of weakness formed in the first ply at the interface between the central and peripheral areas facilitating complete detachment of the first ply central area from the first ply peripheral area. And, first indicia on the first ply top face peripheral area, the first indicia comprising a merchandise order number or item number or both. The second adhesive on the peripheral area of the first ply bottom face connecting the first ply to the second ply top face.

The label assemblies according to the present invention are made in a simple manner utilizing readily commercially available materials. A conventional base label may be purchased and the return address information printed on it, and then the first ply bottom face is patterned coated with an adhesive and applied to the existing label. The web thereof is then fed through a dual die cut unit with the outer die cuts in the outer marginal areas being peeled away while the lines of weakness are being formed and the hole for initiating separation of the severable portion of the label being punched by a conventional preach ring subsequent to die cutting.

It is the primary object of the present invention to provide a simple yet effective business form which is easy to make and use and particularly facilitates accurate and appropriate return of merchandise. This and other objects of the invention will become clear from an inspection of the detailed description of the invention and from the appended claims.

DETAILED DESCRIPTION OF THE DRAWINGS

Figure 1:
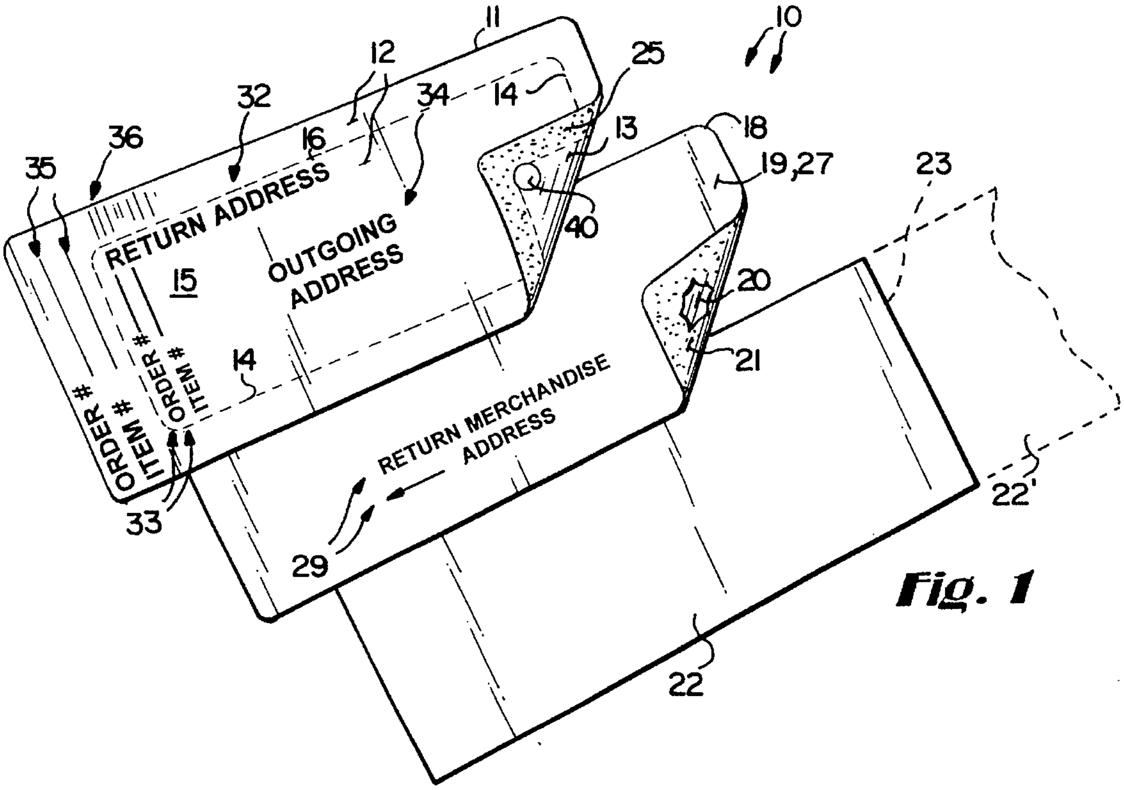
FIG. 1 is a top perspective exploded view of a first embodiment of an exemplary business form/label assembly according to the present invention.
Figure 3:
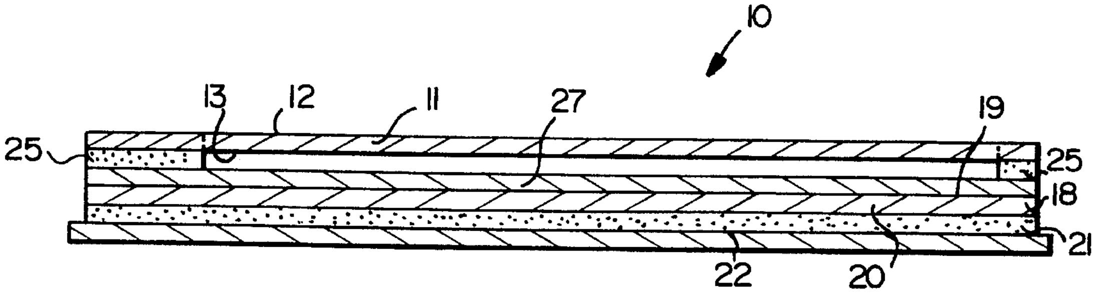
FIG. 3 is a longitudinal cross-sectional view of the label assembly of FIG. 1 taken at a mid-portion thereof.

An exemplary label assembly according to the present invention is shown generally by reference numeral 10 in FIGS. 1 and 3. It includes a first ply 11 having a top face 12 and a bottom face 13 and having lines of weakness formed therein. The lines of weakness may be perforations, such as illustrated at 14 in FIG. 1, e.g. perforations having a cuf/tie ratio that is about 0.113/cut to about 0.012/tie.

Figure 2:
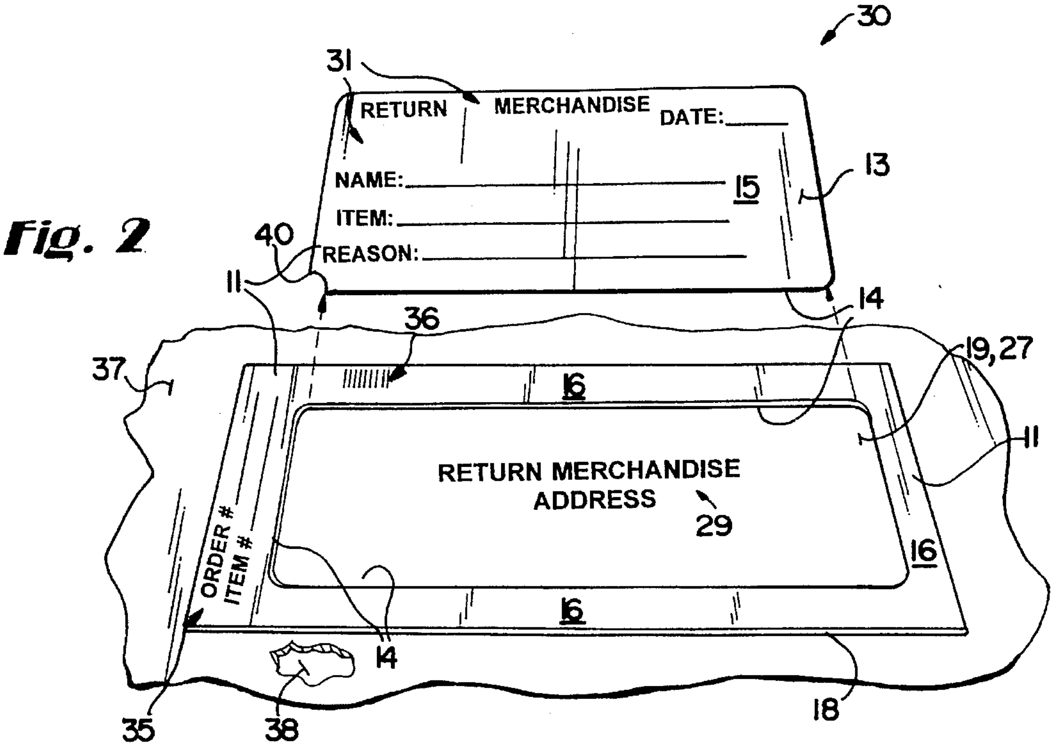
FIG. 2 is a top perspective view showing the second ply of the label assembly of FIG. 1 attached to a package of merchandise, with the central area of the first ply detached and inverted, showing the information requesting form thereof.

The perforation lines 14 separate the first ply 10 into a central area 15, which is the area within the perforation lines 14, and a peripheral area 16, which is the area external of the perforation lines 14. Preferably the perforation lines 14 define a completely enclosed geometric figure (e.g. a rectangle as illustrated in FIGS. 1 and 2), although under some circumstances there may not be a portion of the peripheral area 16 at one edge of the first ply 11, e.g. that edge (or edges) defining part of the central portion 15.

The label assembly 10 also comprises a second ply 18 which has a top face 19 and a bottom face 20. Disposed on the bottom face 20 is a first permanent adhesive 21, preferably a pressure sensitive adhesive. The label assembly 10 may be a lined label assembly, in which case a conventional release sheet (e.g. silicone coated) 22 is provided which covers the pressure sensitive adhesive 21 until it is ready to be used, the release sheet 22 readily separating from the adhesive 21 while the adhesive 21 remains in contact with the bottom face 20 of the second ply 18. Typically the release sheet 22 has a slightly larger imprint (being both slightly larger in width and length for the rectangular configuration illustrated in the drawings) than the second ply 18. Also the entire label assembly 10 may be in continuous form, which is illustrated schematically in FIG. 1 by another release sheet 22' being shown connected to and continuous with a release sheet 22, perhaps with a perforation line 23 therebetween.

The label assembly 10 also comprises second permanent adhesive disposed on the peripheral area 16 of the first ply 11 bottom face 13, but not on the central area 15 thereof. The second adhesive is seen at reference numeral 25 in FIGS. 1 and 3. Note that while the adhesive 25—which preferably also is a permanent pressure sensitive adhesive—and the adhesive 21 are shown as continuous, it should be understood that they may be applied in various patterns as long as the adhesive 21 adequately secures the entire assembly 10 to a package, and as long as the adhesive 25 properly secures the first ply 11 peripheral area 16 to the second ply 18 top face 19.

While other configurations and materials may be provided, it is often desirable to provide a thermosensitive layer 27 on the top face 19 of the second ply 18. The thermosensitive layer forms indicia when heat is selectively applied thereto, as is conventional per se.

The indicia that is applied to various parts of the plies 11, 18 is important in the assembly 10 being able to perform its desired functions according to the invention. Typically a return merchandise address indicia 29, which may human readable, machine readable, or both, is provided on the top face 19, 27 of the second ply 18 underlying the central area 15 of the first ply 11 so that when the central area 15 of the first ply 11 is detached from the peripheral area 16 along the perforation lines 14—forming the merchandise return slip shown generally by reference numeral 30 in FIG. 2—the indicia 29 is exposed and readily visible.

Indicia 31 [see FIG. 2] is provided on the bottom face 13 of the central area 15 of the first ply 11 relating to the return of merchandise. Provided on the top face 12 of the central area 15 of the first ply 11 may also be return address indicia 32, as well as indicia relating to the merchandise, such as order number and item number indicia 33. Also an outgoing address indicia 34 is provided on the central area 15 as seen in FIG. 1.

Indicia 35 is also provided on the top face 12 of the first ply 11 in the peripheral area 16. The indicia 35 also relates to one or both of the order and item number associated with the merchandise packed using the label assembly 10. The order and item number may be in human readable form as indicated at 35, and/or in machine readable form as indicated at 36.

FIG. 2 shows a label assembly 10 after removal of the release sheet 22 and the adhesive 21 being pressed into contact with a package 37 (such as a cardboard box, mailing or other shipping envelope, wooden box, etc.) which contains one or more items of merchandise shown schematically at 38.

The components of the label assembly 10 may be made of a wide variety of materials. In one exemplary embodiment according to the invention, however, the second ply 18, with the thermosensitive layer 27, permanent pressure sensitive adhesive 21, and a release sheet 22 associated therewith, may be a pre-purchased item such as a label product sold by Fasson under the trademark "ULTRALIGHT". In that product the adhesive is acrylic and the second ply 18 is of paper label stock.

In order to facilitate detachment of the merchandise return ticket 30 from the rest of the first ply 11 along the perforation lines 14 a cut out 40 may be provided. This allows insertion of a pencil between the second ply 18 and the bottom face 13 of the central area 15 of the first ply 11, to initiate separation along the perforation lines 14. Instructions may be provided on the top face 12 describing use of the cut out 40.

The first ply 11 may be a thermal transfer sheet, such as available from Appleton, with a weight of about 20 lb. (per 1,000 sheet ream). The second adhesive 25 may be a hot melt adhesive, such as Fuller HMA340 available from H. B. Fuller of Vadnais Heights, Minn. The manner of manufacturing the label assembly 10 is simple and straightforward, and an exemplary procedure therefor will now be described.

The Fasson ULTRALIGHT™ product, consisting of the second ply 18 with thermosensitive layer 27 on the top face thereof, acrylic permanent adhesive 21 on the bottom face 20, and a release liner 22, in continuous form is passed through a thermal printer, so as to imprint the return merchandise address indicia 29 thereon. The bottom face 13 of a web of thermal transfer material which will form the first ply 11 is then also printed to provide the indicia 31 thereon. Substantially simultaneously with this, the return address indicia 32 may be printed if desired, and practical, as well as static parts of the indicia 33, 35 if feasible.

After indicia 31 is printed on the central part 15 of the first ply 11, hot melt permanent pressure sensitive adhesive 25 is applied to the peripheral area 16 of the bottom face 13 of the first ply 11, e.g. by pattern coating. Then the webs forming plies 11, 18 are joined so that the adhesive 25 adheres the first ply 11 to the top face 19 of the second ply 18. Then the composite web is fed through a conventional dual die cut unit in which outer die cuts are provided which may form the outer marginal areas of one or both of the plies 11, 18 as well as the areas therebetween which will be subsequently pulled away (a matrix removal) as is conventional. Simultaneously the so perforation lines 14 may be formed, e.g. having a cut/tie ratio of 0.113/cut to 0.012/tie. Also at this same time the cutout/hole 40 may be punched by a conventional punch ring. The punching may be done simultaneously with, but preferably subsequently to, the die cutting.

Then the label assembly 10, either in continuous or cut sheet form (that is the release liners 22 may be separated along the perforation lines 23 thereof) is shipped to the catalog house warehouse or the like. There the label assemblies 10 are fed through conventional printers, such as Zebra model S-500 thermal printers, which will print the variable information for the indicia 33, 35, and 36 and also print the appropriate outgoing address 34 for a particular order and item. Then the label assembly 10 associated with that order is (if not already previously) detached from the rest of the web of label assemblies (e.g. 22'), the release liner 22 is removed, and the adhesive 21 is placed into contact with the package (e.g. cardboard box) 37 and pressed in a tight, substantially permanent contact therewith. Merchandise 38 is at the same time, or just previously or afterwards, placed into the package 37, and then the package is sealed (e.g. with conventional packing tape). The package 37 is then shipped to the outgoing addressee as indicated by the outgoing address 34.

When the recipient receives the package 37 and opens it up, if there is something unacceptable or unexpected about the merchandise 38 (e.g. wrong color, wrong item, damaged, etc.) the recipient is instructed to, preferably does, insert a pencil in the cut out 40 and initiate detachment of the return ticket 30 along the perforation lines 14 in the rest of the first ply 11. Then the ticket 30 is turned over and on the bottom face 13 thereof (which has no adhesive) the blank spaces provided by the indicia 31 are filled in, such as the reason for return, the date of return, etc. The outgoing address 34 is on the top face 12 of the central part 15 (ticket 30) so a significant amount of information will already be associated with the ticket 30 even if the recipient does not fill it in where indicated by the indicia 31.

Ideally the recipient will insert the completed ticket 30 into the package 37, reseal the package, and then ship the package to the exposed return merchandise address indicated by the indicia 29. However even if the recipient does not complete the ticket 30 because the order and/or item information 35, 36 appears on the package 37 (in the peripheral area 16 of the first ply 11 which remains affixed by the adhesive 25 to the second ply 18, and thus the package 37) it will be possible to contact the recipient and find out the necessary information.

Figure 4:
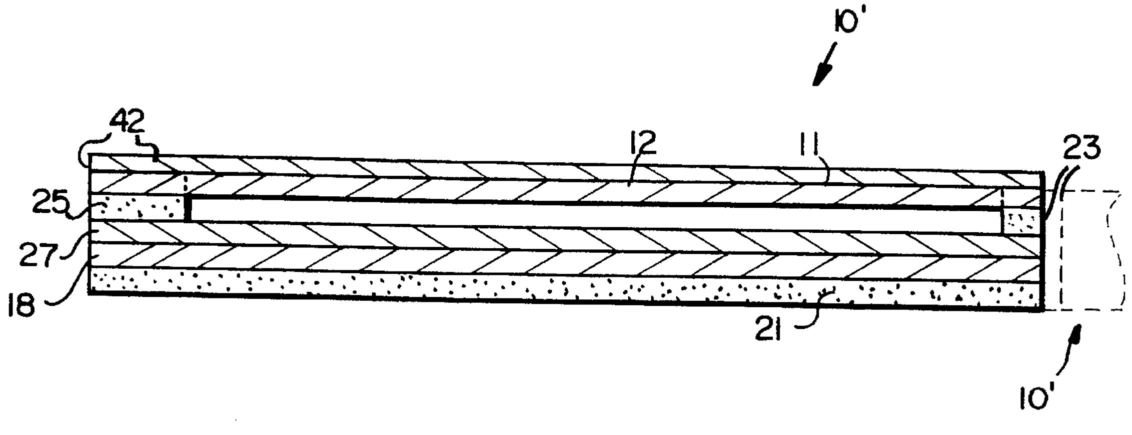
FIG. 4 is a view like that of FIG. 3 for a second embodiment of the label assembly according to the invention.

FIG. 4 shows a second embodiment of the label assembly 10' according to the present invention. This embodiment is essentially the same as the first embodiment illustrated in FIGS. 1 through 3, the label assembly 10, except that it is linerless. Components of the FIG. 4 embodiment comparable to those in FIG. 3 are shown by the same reference numeral.

Since the label assembly 10' is linerless the release sheet 22 is not provided, and instead a release coating 42 is provided on the top face 12 of the first ply 11. The first adhesive 21 either engages the release sheet 42 underlying it in a roll configuration (with like label assemblies 10 attached thereto by perforation lines 23 in the plies 11, 18), or if the label assemblies 10' are in cut sheet format then the underlying label assembly 10' in a stack thereof.

It will thus be seen that according to the present invention a simple yet extremely functional and effective label assembly has been provided, as well as a method of manufacture thereof. While the invention has been herein shown and described in what is presently conceived to be the most practical and preferred embodiment it will be apparent to those of ordinary skill in the art that many modifications may be made thereof within the scope of the invention, which scope is to be accorded the broadest interpretation of the appended claims so as to encompass all equivalent structures and assemblies.

What is claimed is:

1. A label assembly comprising:

a first ply having top and bottom faces, and having a central area and a peripheral area, with an interface therebetween, said peripheral area being continuous and closed, surrounding said central area;

a second ply having top and bottom faces;

first, permanent, adhesive disposed on said second ply bottom face;

second, permanent, adhesive disposed on said peripheral area of said first ply bottom face, but not on said central area of said first ply bottom face;

lines of weakness formed in said first ply at the interface between said central and peripheral areas facilitating complete detachment of said first ply central area from said first ply peripheral area; and first indicia, on said first ply bottom face central area;

said second adhesive on said peripheral area of said first ply bottom face connecting said first ply to said second ply top face.

2. A label assembly as recited in claim 1 wherein said first indicia comprises indicia related to the return of merchandise.

3. A label assembly as recited in claim 2 wherein there is merchandise to which said first indicia relates and which includes an order number or an item number or both; and further comprising second indicia on said first ply top face peripheral area, said second indicia comprising said merchandise order number or item number or both.

4. A label assembly as recited in claim 3 further comprising third indicia on said second ply top face underlying said first ply bottom face central area, said third indicia including return address indicia for return of merchandise corresponding to said second indicia.

5. A label assembly as recited in claim 4 further comprising a release sheet covering said first adhesive on said second ply bottom face.

6. A label assembly as recited in claim 4 further comprising a cutout formed in said first ply central area adjacent a said line of weakness to facilitate initiation of detachment of said central area from said peripheral area along said lines of weakness.

7. A label assembly as recited in claim 4 further comprising fourth indicia comprising return address indicia on said first ply top face central area, and fifth indicia comprising outgoing address indicia on said first ply top face central area.

8. A label assembly as recited in claim 4 wherein said first ply comprises a thermal transfer sheet, and wherein said second ply top face includes a thermosensitive layer for forming indicia when heat is selectively applied thereto.

9. A label assembly as recited in claim 4 wherein said lines of weakness are perforation lines having a cut/tie ratio of about 0.113/cut to about 0.012/tie.

10. A label assembly as recited in claim 1 wherein said first ply comprises a thermal transfer sheet, and wherein said second ply top face includes a thermosensitive layer for forming indicia when heat is selectively applied thereto.

11. A label assembly as recited in claim 4 in combination with a package containing merchandise to which said second indicia relates, said first adhesive adhering said second ply bottom face to said package.

12. A label assembly comprising:

a first ply having top and bottom faces, and having a central area and a peripheral area, with an interface therebetween, said peripheral area being continuous and closed, surrounding said central area;

a second ply having top and bottom faces;

first, permanent, adhesive disposed on said second ply bottom face;

second, permanent, adhesive disposed on said peripheral area of said first ply bottom face, but not on said central area of said first ply bottom face;

lines of weakness formed in said first ply at the interface between said central and peripheral areas facilitating complete detachment of said first ply central area from said first ply peripheral area; and first indicia on said second ply top face underlying said first ply bottom face central area, said first indicia including return address indicia for return of merchandise;

said second adhesive on said peripheral area of said first ply bottom face connecting said first ply to said second ply top face.

13. A label assembly as recited in claim 12 wherein there is merchandise to which said first indicia relates and which includes an order number or an item number or both; and further comprising second indicia on said first ply top face peripheral area, said second indicia comprising said merchandise order number or item number or both.

14. A label assembly as recited in claim 12 further comprising a release sheet coveting said first adhesive on said second ply bottom face.

15. A label assembly as recited in claim 12 and further comprising a cutout formed in said first ply central area adjacent a said line of weakness to facilitate initiation of detachment of said central area from said peripheral area along said lines of weakness.

16. A label assembly as recited in claim 12 wherein said first ply comprises a thermal transfer sheet, and wherein said second ply top face includes a thermosensitive layer for forming indicia when heat is selectively applied thereto.

17. A label assembly as recited in claim 12 wherein said lines of weakness are perforation lines having a cut/tie ratio of about 0.113/cut to about 0.012/tie.

18. A label assembly as recited in claim 13 and in combination with a package containing merchandise to which said second indicia relates, said first adhesive adhering said second ply bottom face to said package.

19. A label assembly comprising:

a first ply having top and bottom faces, and having a central area and a peripheral area, with an interface therebetween, said peripheral area being continuous and closed, surrounding said central area;

a second ply having top and bottom faces;

first, permanent, adhesive disposed on said second ply bottom face;

second, permanent, adhesive disposed on said peripheral area of said first ply bottom face, but not on said central area of said first ply bottom face;

lines of weakness formed in said first ply at the interface between said central and peripheral areas facilitating complete detachment of said first ply central area from said first ply peripheral area; and first indicia on said first ply top face peripheral area, said first indicia comprising a merchandise order number or item number or both;

said second adhesive on said peripheral area of said first ply bottom face connecting said first ply to said second ply top face.

20. A label assembly as recited in claim 19 and in combination with a package containing merchandise to which said first indicia relates, said first adhesive adhering said second ply bottom face to said package.

* * * * *